United States Patent [19]

Hieb et al.

[11] Patent Number: 5,659,389
[45] Date of Patent: Aug. 19, 1997

[54] NON-INTRUSIVE THROTTLE BODY CALIBRATION

[76] Inventors: Bradley John Hieb, 22642 Nash, Dearborn, Mich. 48124-1043; Rafael Espinosa Paredes, 1004 Dragoon, Detroit, Mich. 48209; Jerry Dean Robichaux, 840 Cleophus Pkwy., Lincoln Park, Mich. 48146

[21] Appl. No.: 764,427

[22] Filed: Dec. 12, 1996

[51] Int. Cl.$^6$ .................... G01B 1/00; G01D 5/34
[52] U.S. Cl. ........................ 356/150; 250/231.13
[58] Field of Search ............ 250/559.12, 559.13, 250/559.14, 559.15, 559.29, 231.13; 356/150, 139.1, 152.1

[56] References Cited

U.S. PATENT DOCUMENTS

| | | | |
|---|---|---|---|
| 3,900,738 | 8/1975 | McKay, Sr. ............... | 250/559.14 |
| 4,007,992 | 2/1977 | Petrohilos et al. ............ | 356/387 |
| 4,849,621 | 7/1989 | Yanase et al. ............... | 250/214 |
| 4,893,502 | 1/1990 | Kubota et al. ............... | 73/118.1 |
| 5,004,930 | 4/1991 | Gremaud et al. ............ | 250/559.14 |
| 5,090,811 | 2/1992 | Donaldson .................. | 356/376 |
| 5,160,839 | 11/1992 | Nishiyama et al. .......... | 356/375 |
| 5,270,645 | 12/1993 | Wheeler et al. ............. | 324/207.12 |
| 5,436,462 | 7/1995 | Hull-Allen .................. | 356/374 |

Primary Examiner—Frank G. Font
Assistant Examiner—Zandra V. Smith

[57] ABSTRACT

A system for calibrating production throttle bodies in which a throttle body (18) is mounted in a fixture (16) and light is transmitted by a light source (12) through the throttle body main bore (20) onto a translucent screen (22). A camera (14) senses the light regions (34) and transmits the information to a controller (26), which calculates the angular position of the throttle valve (32).

12 Claims, 2 Drawing Sheets

NON-INTRUSIVE THROTTLE BODY CALIBRATION

FIELD OF THE INVENTION

The present invention relates to calibration of throttle bodies used in the air intake systems of internal combustion engines and more particularly to non-intrusive calibration of the throttle plate position within the throttle body.

BACKGROUND OF THE INVENTION

Conventional throttle bodies are operated mechanically and employ a position sensor mounted to a valve shaft to sense the position of a throttle valve. While generally adequate, there is risk of inaccurate reading of the position by a mis-calibrated sensor. However, with emissions and fuel economy standards on the rise, allowing for these potential inaccuracies in sensor calibration is becoming more of a concern.

Further, in order to allow for additional flexibility and precision in operation of the throttle body assemblies, some vehicle manufacturers are considering the use of electronically controlled throttle bodies, which are not mechanically linked to the accelerator pedal. Some examples of electronic controls are stepper motor controlled throttle valve movement, stepper motor idle control and purely electronic throttle control. In these cases, accuracy of the electronic control in positioning the throttle valve is important, creating even more concerns with the potential for initial calibration inaccuracies.

Thus, a means for better testing for initial calibration of throttle bodies is becoming more important. Current testing and calibration techniques are cumbersome and expensive. Conventional techniques for production testing of throttle plate positioning include, among others, either integral, throttle body mounted, potentiometer type sensors, or external position sensors such as inductive pickup encoders that require the throttle to be partially disassembled so that the sensor can be temporarily attached to the throttle plate shaft. This partial disassembly for production testing of throttle plate positioning is a time consuming task that limits throughput of throttle bodies under the calibration test procedures.

Therefore, a quick and inexpensive system is needed that will accurately measure the calibration of production throttle bodies.

SUMMARY OF THE INVENTION

In its embodiments, the present invention contemplates an apparatus for determining the angle of a throttle valve relative to a bore, having first and second ends, through a throttle body. The apparatus includes a test fixture adapted to mount and position the throttle body, and means for orienting the throttle valve to a predicted predetermined angular position. A light source is adapted to align with and shine through the first end of the bore in the throttle body, and a translucent screen is adapted to align with the second end of the bore. A light receiving camera is mounted opposite the translucent screen from the light source, with a controller electrically connected to the camera to receive a signal therefrom.

The present invention further contemplates a method of determining the angle of a throttle valve mounted within a bore of a throttle body, relative to the throttle body, with the bore having first and second ends. The method comprises the steps of: fixing the location of the throttle body; orienting the throttle valve to a predicted predetermined angular position; transmitting light through the first end of the bore of the throttle body; measuring light emitted from the second end of the bore; and calculating an actual angular position of the throttle valve.

Accordingly, an object of the present invention is to provide a system to accurately and quickly determine the relative angular position of a throttle valve in a production throttle body to allow for testing the positioning of the throttle plate and/or validating the accuracy of integral throttle body mounted position sensors.

An advantage of the present invention is that this test can be used to calibrate production throttle bodies without any need for disassembly or destruction of components during testing, making test procedures quick and simple.

DETAILED DESCRIPTION OF THE PREFERRED EMBODIMENTS

Figure 1:
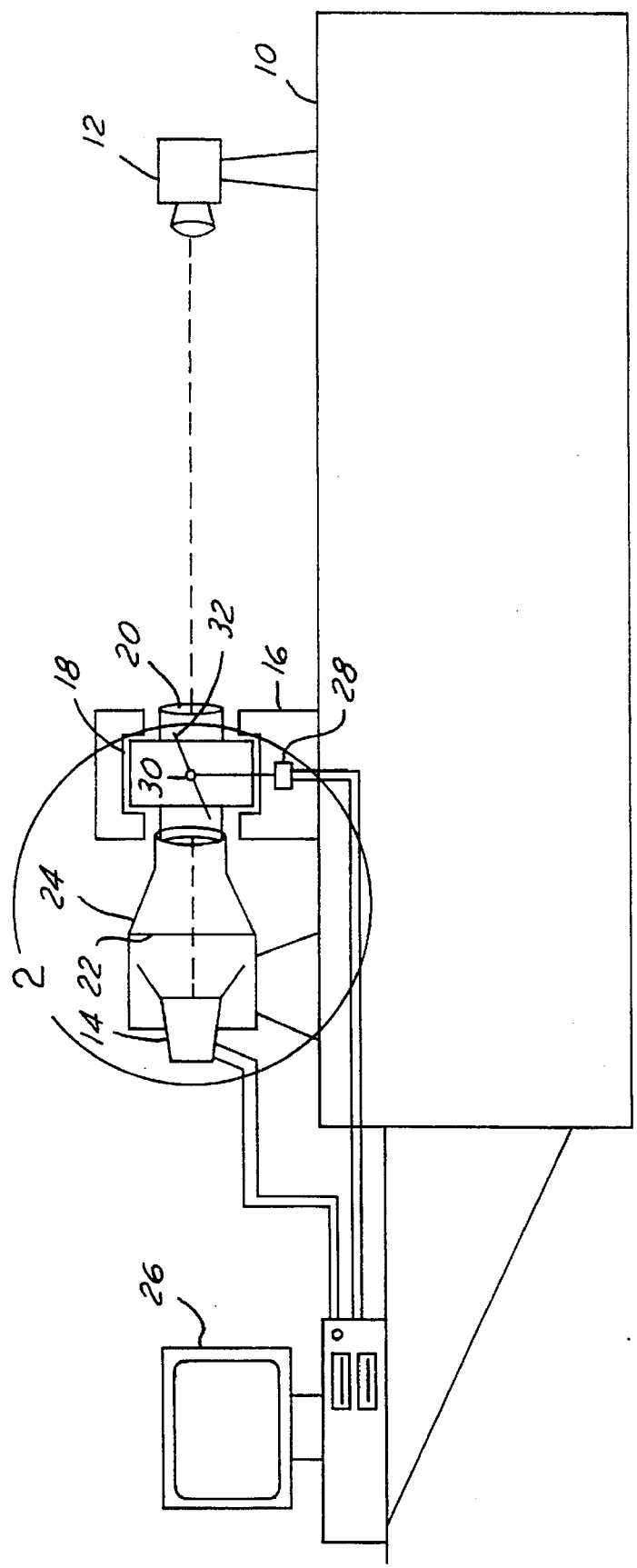
FIG. 1 is a schematic view of a throttle body and test setup in accordance with the present invention.

A test stand 10 is used as a base to mount a light source 12, a charge coupled device (CCD) camera 14 and a mounting fixture 16, aligned co-linearly For example, the CCD camera can be a model XE75 camera made by Sony corporation. The light source can be any light source producing typical non-coherent light. A translucent screen 22 is mounted in front of the camera 14 to actually receive the light. The light source 12 and camera 14 are positioned on the stand 10 so that the light source 12, screen 22 and CCD camera 14 are located coaxial with the axis of a main bore 20 in the throttle body 18. Thus, when a throttle body 18 to be tested is mounted in the fixture 16, the light from the light source 12 that passes through the main bore 20 in the throttle body 18 will hit the translucent screen 22. Preferably, a light shielding enclosure 24 extends between the main bore 20 and the translucent screen 22 to block out light from other sources that may interfere with the test.

The camera 14 is connected to a controller 26. The output from the camera 14 can then be fed into the controller 26 for analysis. The controller 26 incorporates functions to measure the area of light or dark regions. The controller 26 can be a conventional PC type general purpose computer with machine vision software; or it can be the conventional PC with a plug-in card containing image processing hardware and software, for example an image acquisition card, model number IMAC-PCI1408, made by National Instruments.

Also, the controller 26 connects to a throttle position control mechanism 28. For an electronic throttle body (as illustrated in FIG. 1), this mechanism 28 is the actual electric motor which is coupled to a throttle shaft 30, upon which a throttle valve 32 is mounted. In this way, signals can be sent from the controller 26 the same as from an on-board computer which would control the motor for the throttle position in an actual vehicle. For this type of test, then, the actual motor is calibrated by this test. For a mechanical throttle body, this mechanism 28 will mechanically drive the throttle valve 32 to given positions, and the output of a throttle position sensor will then be monitored by the controller 26 for accuracy.

This system, then, uses light shown through a throttle bore, in conjunction with a machine vision system to indirectly measure the angle of the throttle valve 32 within the throttle body 18. The throttle valve 32 is illustrated herein as a butterfly valve, but this system can also be used for calibration of barrel valves, if so desired, with modifications to the angle calculation equations. Once the controller 26 has received the information from the camera 14, since it contains the machine vision software, it can then proceed to calculate the flow area past the throttle valve 32. This flow area is directly related to the throttle valve angular position. The angular position of the throttle valve 32, therefore, can be calculated by the controller 26 from this flow area with software loaded into it. The flow area (FA) is related to the throttle angle by a flow area equation stored in the software of the controller 26, which is:

$$FA=(\pi D^2/4)\{(1-(\cos\theta/\cos\theta_0))+(2/\pi)[a/\cos\theta)(\cos^2\theta-a^2\cos^2\theta_0)^{1/2}+(\cos\theta/\cos\theta_0)\sin^{-1}(a\cos\theta_0/\cos\theta)-a(1-a^2)^{1/2}-\sin^{-1}a]\}$$

Where: D=throttle bore diameter;
d=throttle shaft diameter;
a=d/D;
$\theta$=throttle plate angle relative to a plane perpendicular to the axis of the main bore;
$\theta_0$=throttle plate angle with plate closed in the main bore.

Figure 2:
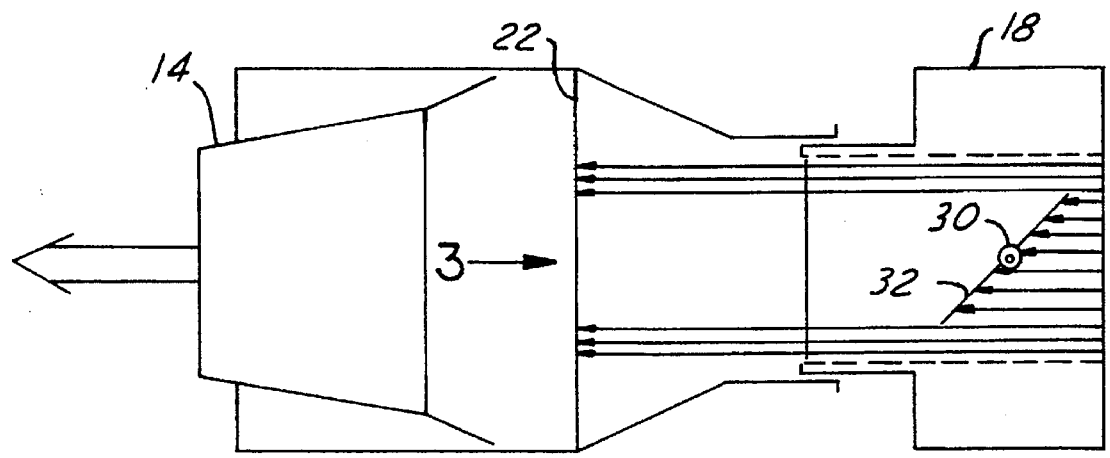
FIG. 2 is a schematic view, on an enlarged scale of the encircled area 2 in FIG. 1, illustrating the light passing through the throttle body during testing.
Figure 3:
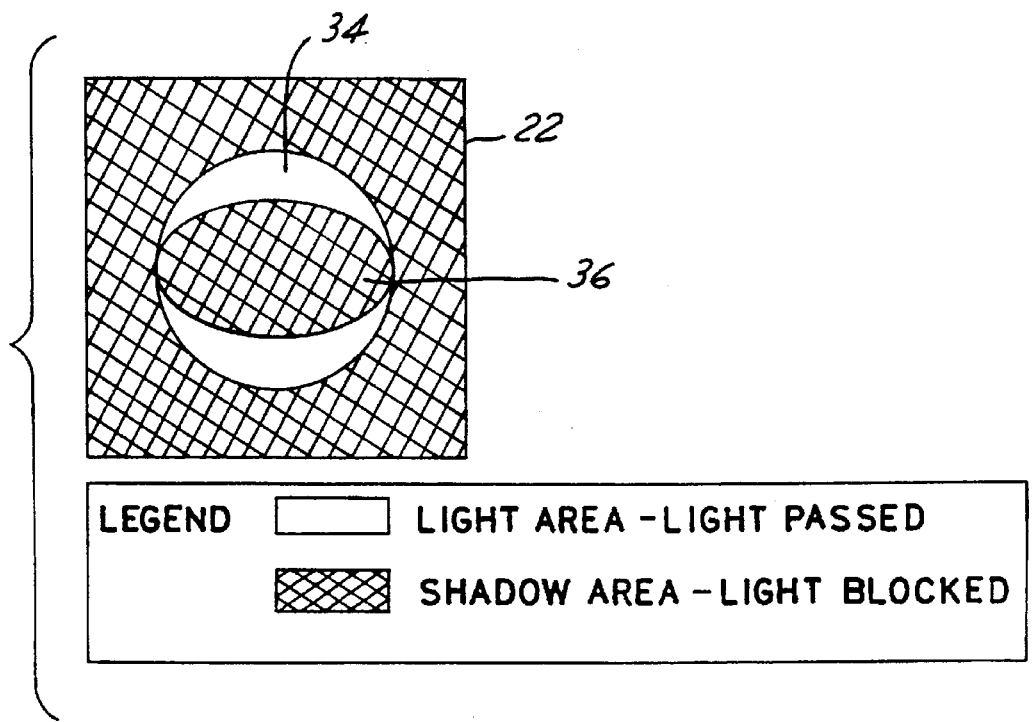
FIG. 3 is a graphical representation of the light transmitted onto a translucent screen taken from a view in the direction of arrow 3 in FIG. 2.

The operation of this system will now be described. First, the throttle body 18 to be tested is mounted in the fixture 16 with the proper orientation, with one end of the main bore 20 facing the light source 12 and the other end extending to the light shield 24. The controller 26 is electronically connected to the control mechanism 28, which actuates the throttle valve 32 and moves it to a predicted predetermined angular position. The light source 12 then directs light rays through the main bore 20 onto the translucent screen 22. The arrows in FIG. 2 illustrate the light directed into the main bore 20. The throttle valve 32 and shaft 30 block some of the light rays, forming an image of the throttle bore 20 and throttle valve 32 on the screen 22, as is illustrated in FIG. 3. This image is composed of two components, lighter, higher intensity light regions 34 and dark, low intensity regions 36.

The camera 14, coupled with the controller 26 quickly and accurately differentiate these two regions, thus allowing a calculation of the area of the higher intensity light whose area is proportional to the air flow area of the throttle body 18. The controller 26 now calculates the actual angle of the throttle valve 32. The actual throttle angle is now compared to the predicted predetermined throttle angle to determine what error, if any, exists for the particular throttle body assembly 18 being tested.

For further testing, if so desired, the throttle valve 32 can then be rotated to a new predicted predetermined angular position and the sequence run again, until a satisfactory amount of data for this throttle body 18 is collected. The throttle body 18 can then be adjusted as necessary to account for any inaccuracies before assembled onto a vehicle.

While certain embodiments of the present invention have been described in detail, those familiar with the art to which this invention relates will recognize various alternative designs and embodiments for practicing the invention as defined by the following claims.

We claim:

1. A method of determining the angle of a throttle valve mounted within a bore of a throttle body, relative to the throttle body, with the bore having first and second ends, the method comprising the steps of:

fixing the location of the throttle body;
orienting the throttle valve to a predicted predetermined angular position;
transmitting light through the first end of the bore of the throttle body;
measuring light emitted from the second end of the bore; and
calculating an actual angular position of the throttle valve.

2. The method of claim 1 further comprising the step of comparing the predicted predetermined angular position to the actual angular position of the throttle valve.

3. The method of claim 1 wherein the step of measuring the light comprises the steps of:

providing a translucent screen adjacent the second end of the bore; and
measuring the area in which the light hits the translucent screen.

4. The method of claim 3 wherein the step of calculating the actual angular position comprises:

determining the flow area from the measured area of light on the translucent screen; and
computing the actual angular position from the flow area.

5. The method of claim 4 wherein the step of computing the actual angular position comprises computing an angle $\theta$ from the equation $FA=(\pi D^2/4)\{(1-(\cos\theta/\cos\theta_0))+(2/\pi)[(a/\cos\theta)(\cos^2\theta-a^2\cos^2\theta_0)^{1/2}+(\cos\theta/\cos\theta_0)\sin^{-1}(a\cos\theta_0/\cos\theta)-a(1-a^2)^{1/2}-\sin^{-1}a]\}$; where: D=a throttle bore diameter; d=a throttle shaft diameter; a=d/D; $\theta$=throttle valve angle relative to a plane perpendicular to the axis of the main bore; and $\theta_0$=a throttle valve angle with the valve closed in the bore.

6. The method of claim 1 further comprising the steps of:

orienting the throttle valve to a second predicted predetermined angular position;
transmitting light through the first end of the bore of the throttle body;
measuring light emitted from the second end of the bore; and
calculating a second actual angular position of the throttle valve.

7. The method of claim 6 further comprising the steps of comparing the predicted predetermined angular position to the actual angular position of the throttle valve, and comparing the second predicted predetermined angular position to the second actual angular position of the throttle valve.

8. An apparatus for determining the angle of a throttle valve relative to a bore, having first and second ends, through a throttle body, the apparatus comprising:

a test fixture adapted to mount and position the throttle body;
means for orienting the throttle valve to a predicted predetermined angular position;
a light source adapted to align with and shine through the first end of the bore in the throttle body;
a translucent screen adapted to align with the second end of the bore;
a light receiving camera, mounted opposite the translucent screen from the light source; and
a controller electrically connected to the camera to receive a signal therefrom.

9. The apparatus of claim 8 further comprising a light shielding enclosure adapted to be mounted between the second end of the bore and the light receiving camera.

10. The apparatus of claim 8, wherein the means for orienting the throttle valve is electronically connected to and is operable by the controller.

11. The apparatus of claim 8 wherein the light receiving camera is a CCD camera.

12. A method of determining the angle of a throttle valve mounted within a bore of a throttle body, relative to the throttle body, with the bore having first and second ends, the method comprising the steps of:

provic a test fixture adapted to mount and position the throttle body;

providing means for orienting the throttle valve to a predicted predetermined angular position;

providing a light source adapted to align with and shine through the first end of the bore in the throttle body;

providing a translucent screen adapted to align with the second end of the bore;

providing a light receiving camera, mounted opposite the translucent screen from the light source;

providing a controller electrically connected to the camera to receive a signal therefrom; and providing a light shielding enclosure adapted to be mounted between the second end of the bore and the light receiving camera.

* * * * *

UNITED STATES PATENT AND TRADEMARK OFFICE
CERTIFICATE OF CORRECTION

PATENT NO. : 5,659,389
DATED : Aug. 19, 1997
INVENTOR(S) : Bradley John Hieb, Rafael Espinosa Paredes, Jerry Dean Robichaux It is certified that error appears in the above-identified patent and that said Letters Patent is hereby corrected as shown below:

On the title page insert:

Attorney, Agent, or Firm - Donald A. Wilkinson

Assignee: Ford Global Technologies, Inc. Dearborn, Michigan (Not listed on the Issued Patent)

Signed and Sealed this

Twenty-third Day of December, 1997

Attest:

BRUCE LEHMAN

*Attesting Officer*  *Commissioner of Patents and Trademarks*